United States Patent
Marioni (10) Patent No.: US 7,471,054 B2
(45) Date of Patent: Dec. 30, 2008

(54) METHOD FOR DETECTING UNBALANCED CONDITIONS OF A ROTATING LOAD DRIVEN BY A SYNCHRONOUS MOTOR AND FOR CONTROLLING SAID MOTOR

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 356 days.

(21) Appl. No.: 10/559,856

(22) PCT Filed: Jun. 10, 2004

(86) PCT No.: PCT/EP2004/006279

§ 371 (c)(1),
(2), (4) Date: Apr. 13, 2006

(87) PCT Pub. No.: WO2004/111324

PCT Pub. Date: Dec. 23, 2004

(65) Prior Publication Data

US 2006/0238152 A1 Oct. 26, 2006

(30) Foreign Application Priority Data

Jun. 11, 2003 (EP) .................................. 03425379

(51) Int. Cl.
*H02P 1/00* (2006.01)

(52) U.S. Cl. ..................... 318/268; 68/12.06; 68/12.14; 8/159

(58) Field of Classification Search ................ 318/638, 318/69, 71, 72, 400.15, 268; 68/12.06, 12.14
See application file for complete search history.

(56) References Cited

U.S. PATENT DOCUMENTS

| 5,677,606 | A | 10/1997 | Otake |
| 6,047,428 | A * | 4/2000 | Min ............................. 8/159 |
| 6,240,586 | B1 * | 6/2001 | Joo .............................. 8/159 |
| 6,341,507 | B1 | 1/2002 | Rode et al. |
| 6,564,592 | B2 * | 5/2003 | Bruce et al. ............... 68/12.06 |
| 6,941,679 | B1 * | 9/2005 | Harris et al. ................. 34/596 |
| 6,973,392 | B2 * | 12/2005 | Zeh et al. ..................... 702/60 |
| 2001/0052265 | A1 | 12/2001 | French et al. |
| 2002/0035757 | A1 | 3/2002 | Ciancimino et al. |

* cited by examiner

*Primary Examiner*—Bentsu Ro
*Assistant Examiner*—David S Luo
(74) *Attorney, Agent, or Firm*—Akerman Senterfitt (57) ABSTRACT

The invention relates to a method for detecting unbalanced conditions of a rotating load driven by a synchronous electric motor (3) in washing machines (1) and similar rotably drum (2) household appliances and wherein at least a transient step is provided with variation of the angular speed (w) of the rotably drum (2). The method provides the following steps: constantly monitoring the instantaneous current (Iq) absorbed by the motor calculating in real time the unbalanced mass (m) on the basis of the variation ($\Delta$) of the current (Iq) and starting from a predetermined reference and by applying a calculation formula representative of the kind of load imbalance. Moreover, the imbalance signal may be computed as a difference between the last sampled value of the current signal (Iq), in the time instant wherein the absolute value of the first derivate of said current signal (Iq) is minor than a predetermined threshold and the second derivate of the same signal Iq is positive, and the last sampled value of said current signal (Iq) in the time instant wherein the absolute value of the first derivate of said current signal (Iq) is minor than a predetermined threshold and the second derivate of the same signal Iq is negative current driving the motor (3) according to said unbalanced mass (m).

13 Claims, 6 Drawing Sheets

METHOD FOR DETECTING UNBALANCED CONDITIONS OF A ROTATING LOAD DRIVEN BY A SYNCHRONOUS MOTOR AND FOR CONTROLLING SAID MOTOR

FIELD OF APPLICATION

The present invention relates, in its more general aspect, to a method for detecting unbalanced conditions of a rotating load driven by a synchronous electric motor and for controlling the activation of said motor.

In particular this invention relates to a method for detecting load unbalanced conditions in washers, washing machines and similar rotably drum household appliances, wherein the drum is rotation-driven by a permanent magnet synchronous electric motor. The method provides to control the motor electric supply in order to drastically reduce vibrations and oscillations as well as the undesired effects of such vibrations like: noise, shaking and operation unevenness.

PRIOR ART

As it is well known, domestic washing machines are equipped with a rotably drum which is rotation-driven by an electric motor.

In the domain of the present invention, washing machines mean any kind of household appliance having a rotably drum containing a variable load both for mass and for space arrangement inside the drum.

Some solutions for determining possible imbalances of the load in the rotably drum are already known.

A first known technical solution is described for example in the European patent no. EP 0 143 685 concerning a method for determining the linen mass in the drum by measuring the rotably drum torque value during a constant acceleration operating step.

However this solution does not help in determining a load imbalance.

Another solution described by the prior art in the European patent no.

EP 71 308 suggests to detect a load imbalance by monitoring only the drum rotation speed by means of a speedometer dynamo. Sudden speed variations are representative of a load imbalance.

This method is however not completely reliable and it provides not very precise results because of the indirect measuring, against a considerable cost due to the provision of electronic components for monitoring speed variations.

Other solutions are described in the U.S. Pat. No. 5,507,054 and in the European patent no. 0 476 588 but they concern however not completely satisfactory methods in terms of costs and/or performances provided.

Moreover it must be said that the washing machine rotably drum is rotation-driven by slip-ring universal electric motors designed with an external stator and a slot-winded central rotor, which is constrained to a rotation shaft being integral with a pulley. The drum is kinematically connected to the pulley by means of a second pulley and a driving belt.

These universal motors have some efficiency and consumption problems, thus in contrast with current energy saving trends. Other drawbacks are due to the high rotation speed and to the low static torque, imposing high driving ratios.

Washing machines whose rotably drum is driven by a permanent magnet synchronous motor have been marketed only recently. Such a solution is disclosed for example in the U.S. Pat. No. 6,341,507 to Miele. This document relates to a washing machine including a synchronous motor 10 arranged on the drum 6 and comprising single pole windings driven by a frequency converter providing voltage values to supply continuous currents in all strands.

The use of synchronous motors implies the solution of driving problems due to the fact that the excitation magnetic flux, which is constant because of permanent magnets, requires relatively higher current absorptions by stator windings to conveniently adjust speed and direction variations of motor rotation.

Moreover, to limit the current on the single coil, so to avoid the demagnetization risk, the stator must be split into a larger number of poles.

These features of the synchronous motor make the motor driving during the steps when the load is unbalanced particularly complex and not easily determinable on the basis of the several methods provided for the universal motors' driving. The previous solution reported in the U.S. Pat. No. 6,341,507 does not provide suggestions about how handling unbalanced conditions of the load.

A known solution for detecting unbalanced condition in a load driven by a motor is disclosed in another U.S. Pat. No. 5,677,606 which relates to an electronic device for a three phase induction motor comprising current detection means for detecting the instantaneous value of the input current, means for determining a current average value, comparison means for comparing those two values, a counter for counting the number of times the detected values exceeds a predetermined reference value and means for stopping the motion of the load after a predetermined number of exceeded values.

This solution however does not refer to a synchronous motor.

The technical problem underlying the present invention is to provide a method allowing an unbalanced mass to be detected quite precisely and rapidly in the load of the rotably drum of a washing machine driven by a synchronous motor with a permanent magnet rotor and a real-time intervention on the synchronous motor driving in order to reduce in real time any oscillation in the bud thus fading out possible subsequent vibration of the whole washing machine structure.

SUMMARY OF THE INVENTION

The solution idea underlying the present invention moves from the premise that a relation exists between the load imbalance and the current absorbed by the synchronous motor and it provides a measure of the current differential at different rotation speeds of the machine drum. The method is advantageously applied to a machine equipped with a synchronous motor having an external rotor being kinematically connected to the machine rotably drum with a relatively low driving ratio.

On the basis of this solution idea the technical problem is solved according to the present invention by a method as previously indicated and characterised by the following steps:
- constantly monitoring and detecting the instantaneous current absorbed by the motor;
- calculating in real time the value of an unbalanced mass on the basis of the variation of said current from a predetermined reference obtained from experimental result and by applying a calculation formula representative of the kind of load imbalance;
- current driving said motor according to said value of unbalanced mass adjusting the angular revolution speed of the motor.

The features and advantages of the method according to the invention will be apparent from the following description of an embodiment thereof with reference to the attached drawings given by way of non-limiting example.

DETAILED DESCRIPTION

With reference to the drawings, 1 schematically shows a washing machine with rotably drum 2, for which a synchronous electric motor 3 is used, according to the present invention. In particular, the electric motor 3 is a permanent magnet motor and of the so-called external-rotor type, i.e. of the type in which the rotor 4 is mounted externally to the respective stator.

Figure 1:
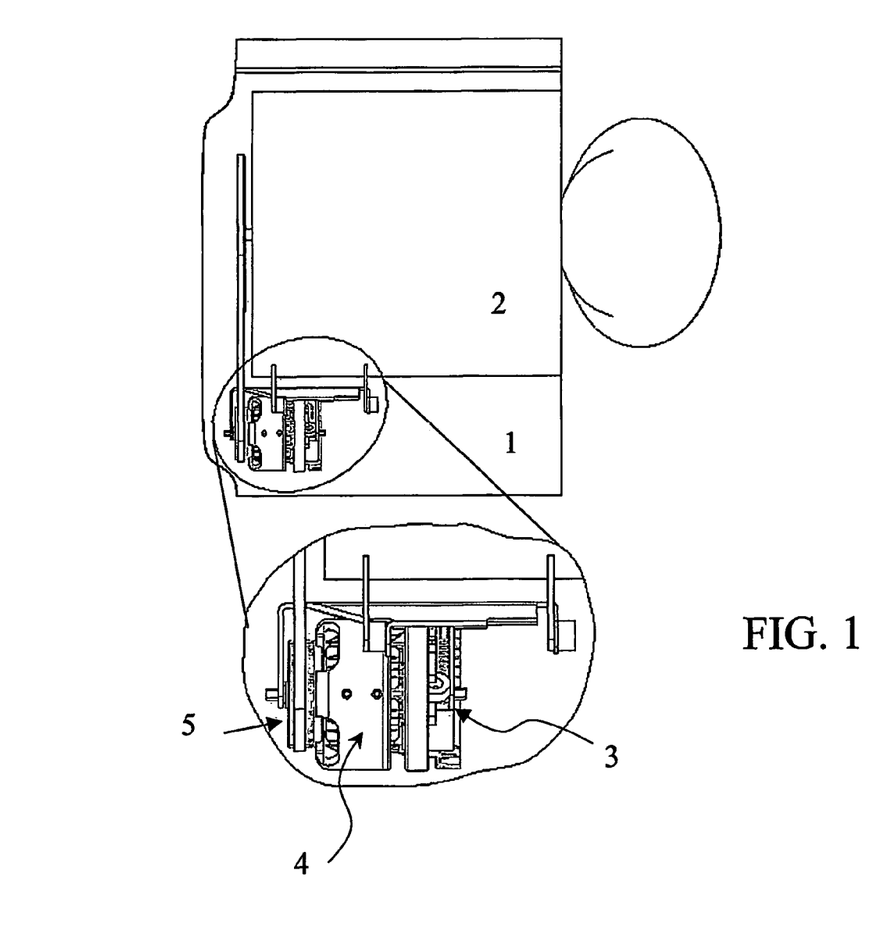
FIG. 1 schematically shows a washing machine incorporating an external-rotor synchronous electric motor according to the present invention.

Conventionally, the motor 3 is kinematically connected to the rotably drum 2 of the washing machine 1 by means of a belt and pulley connection 5 which can be seen in FIG. 1 characterised by a relatively low driving ratio.

The motor 3 drives in rotation the drum 2 with an angular speed w adjusted by an electronic control device, generally a driving inverter circuit, operating on the current Iq absorbed by the synchronous motor.

The current Iq is to be considered as an electric signal proportional to the torque output produced by the motor 3.

The method according to the invention allows an unbalanced linen mass m inserted in the rotably drum 2 of the machine 1 to be determined.

Figure 2:
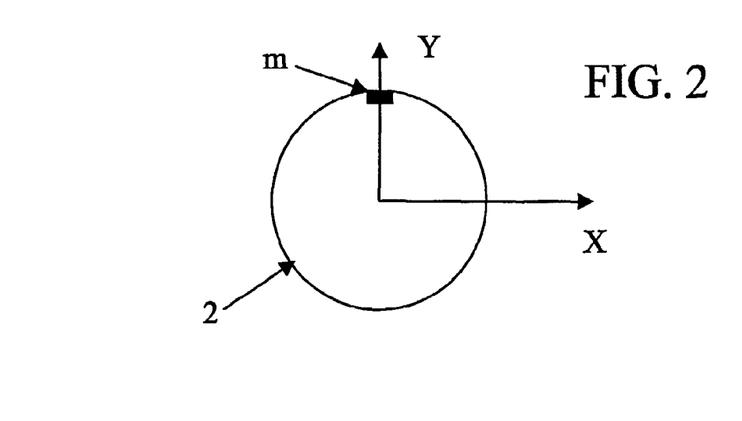
FIG. 2 is a schematic view of the drum of the washing machine of FIG. 1 incorporating an eccentric mass producing a static imbalance.
Figure 3:
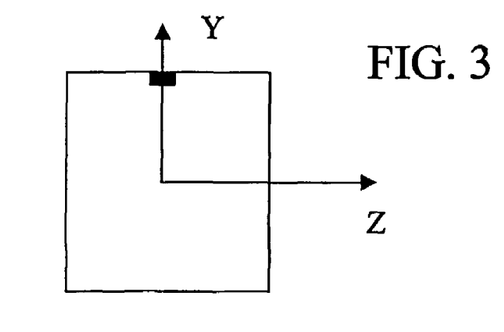
FIG. 3 is a schematic view of the effects on the drum of the eccentric mass of FIG. 2.

FIG. 2 shows very schematically the drum 2 containing an unbalanced mass m.

Figure 8:
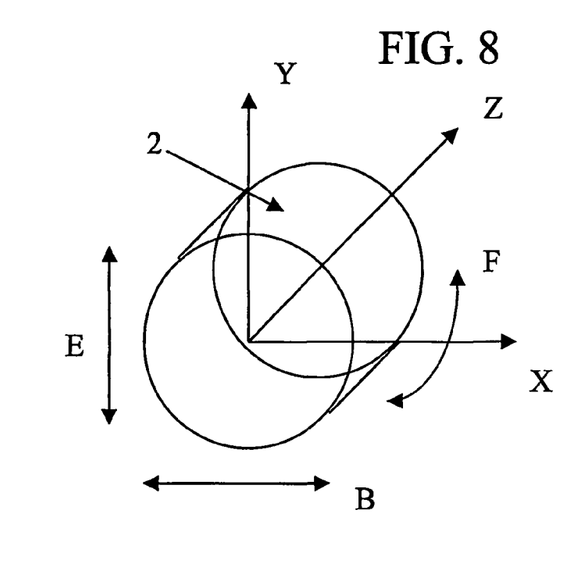
FIGS. 8 and 9 are respective schematic views showing the possible vibration directions of the washing machine drum with an unbalanced load.
Figure 9:
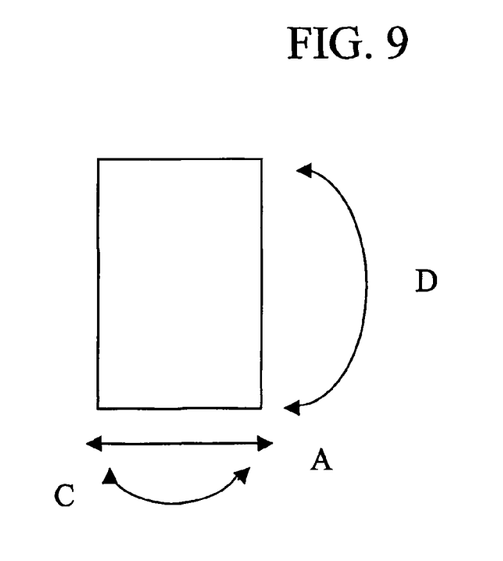

The presence of this unbalanced mass m causes a drum oscillation in the direction of the arrows A, B and E of FIGS. 8 and 9. Substantially in the direction of axes X, Y and Z.

This imbalance condition will be called hereinafter "static" imbalance Sb in the sense that it mainly occurs at constant rotation speed, i.e. when there is a predetermined and constant motor number of revolutions RPM during the washing step.

Figure 4:
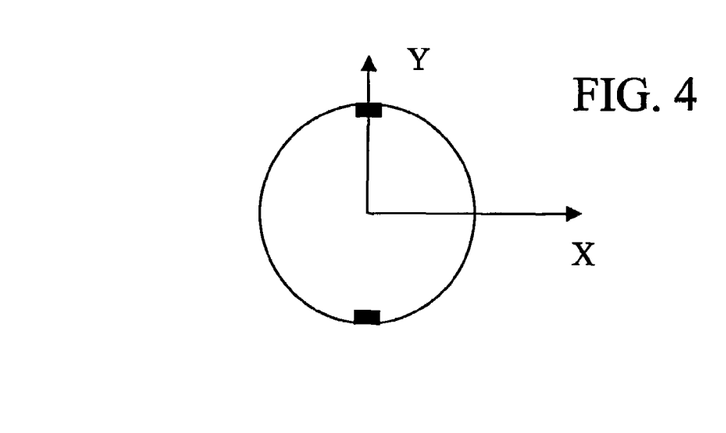
FIG. 4 is a schematic view of the drum of the washing machine of FIG. 1 incorporating an eccentric mass producing a dynamic imbalance.
Figure 5:
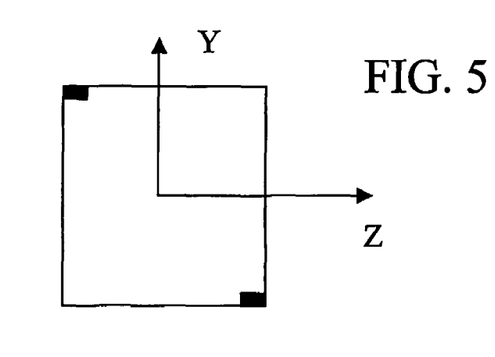
FIG. 5 is a schematic view of the effects on the drum of the eccentric mass of FIG. 4.

The situation schematically shown in FIG. 4 concerns on the contrary a "dynamic" imbalance Sd of the mass m which causes a drum 2 oscillation in the directions C, D and F, but with a higher amplitude with respect to the static imbalance.

Figure 6:
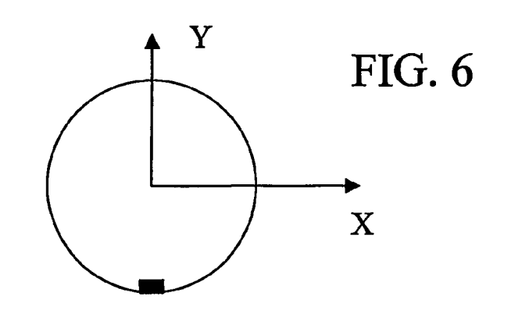
FIG. 6 is a schematic view of the drum of the washing machine of FIG. 1 incorporating an eccentric mass producing a combined static-dynamic imbalance.

A possible combination of the two types of imbalance, static and dynamic, is schematically shown in FIG. 6 and it concerns a kind of imbalance causing a drum 2 oscillation with a linear combination of the vibration modes according to directions A, B, C, D, E and F.

The method according to the invention moves from the premise that a relation exists between the load imbalance, whether static or dynamic, and the current Iq absorbed by the synchronous motor. More specifically, the current Iq is obtained according to the transform by Clark & Park to the phase currents of the motor.

A series of experimental measures performed by the Applicant has allowed a correlation law to be determined between the static and dynamic imbalance and an operator σ representing the standard deviation of the current Iq absorbed by the motor, even according to the revolution speed w of the drum 2. This operator a is detected both in static imbalance conditions and in dynamic imbalance conditions, as it will be apparent in the following description.

More particularly, for the static imbalance the following relation applies:

$$Sb = m * K1(w) \tag{1}$$

Where: m is the imbalanced mass to be determined and K1(w) is a known value drawn by an experimental curve obtained for different revolution speeds and for different mass m values.

The data obtained from said experimental curve are stored in a memory unit and used as a reference to compare the current and speed detected values with reference values. The memory unit may be for instance a non volatile programmable memory device not shown in the drawing being of a conventional type.

The imbalance Sb is drawn by simply detecting the standard deviation σ of the current Iq (in $A \times 10^{-3}$) absorbed by the motor, according to the following relation:

$$Sb = \sigma(Iq)\text{static} \tag{2}$$

The following table 1 shows some experimental measures of the static imbalance Sb, as well as static and dynamic, according to the vibration directions and number of revolutions RPM of the drum 2.

In the range between 60 and 200 RPM, it can be noticed that the static imbalance σ(Iq) corresponds to the standard deviation of the static current Iq, which is almost constant if it is measured in the absence of system resonance conditions. In this RPM range only the static+dynamic σ(Iq) varies, which corresponds to the standard deviation of the static+dynamic Iq.

TABLE 1

| Direction | σ(Iq) (A × 10⁻³) static | σ(Iq) (A × 10⁻³) static + dynamic | Wris (Hz) | Drum RPM |
|---|---|---|---|---|
| A | 118 | 180 | 6.8 | 56.7 |
| B | 135 | 211 | 9.5 | 79.2 |
| C | 107 | 194 | 11.45 | 95.5 |
| D | 94 | 235 | 14.56 | 121.5 |
| E | 155 | 261 | 16.83 | 140.7 |
| F | 384 | 537 | 24.6 | 205 |

Figure 10:
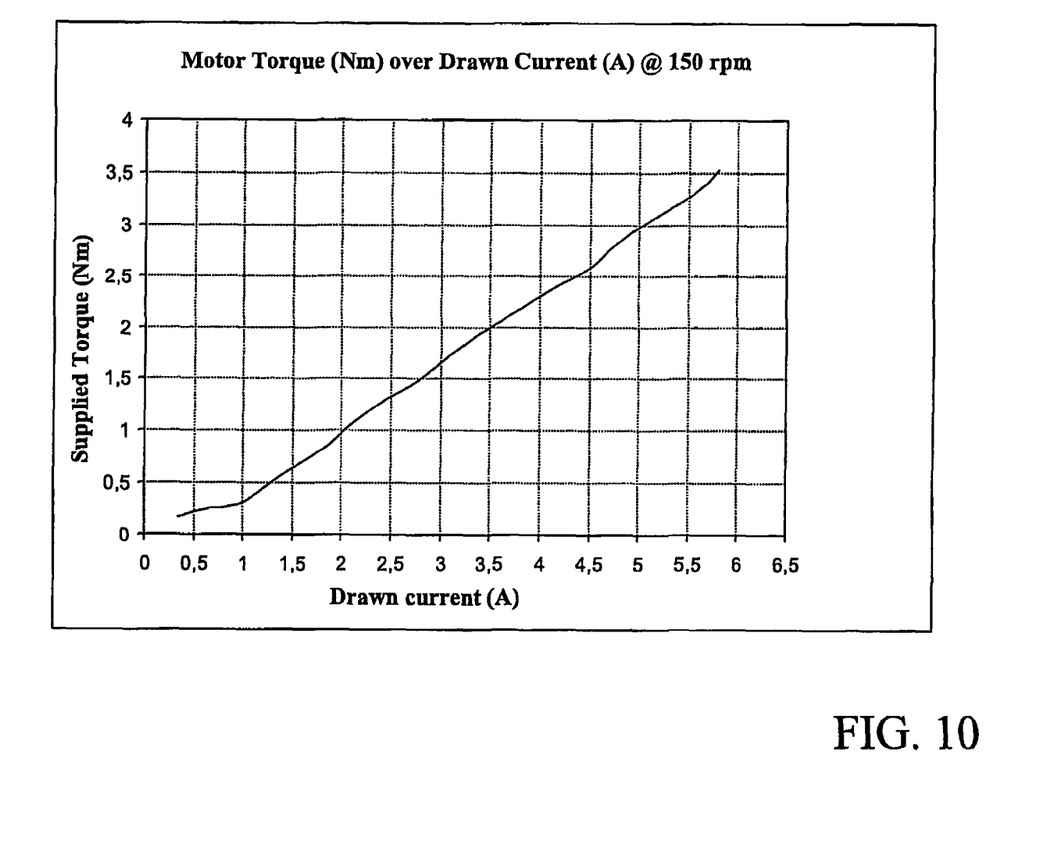
FIG. 10 shows a diagram showing a linearity relation between the torque generated by the synchronous motor of the machine of FIG. 1 and the current Iq absorbed by the same motor.

FIG. 10 schematically shows a diagram showing the torque variation in Nm of the motor 3 according to the absorbed current Iq, in Ampere.

As it can be noticed, the relation between the torque and the current is almost linear for the permanent magnet synchronous motor 3. This allows the imbalance Sb value to be easily drawn.

On the contrary, for a dynamic imbalance the following relation applies.

$$Sd = m*K2*w^\alpha + Ko \quad (3)$$

Where: Ko, K2 and $\alpha$ are known constant values experimentally determined similarly to the parameter K1 of the relation (1), while Sd is always provided by a relation similar to (2), i.e.

$$Sd = \sigma(Iq)_{dynamic} \quad (4)$$

Figure 7:
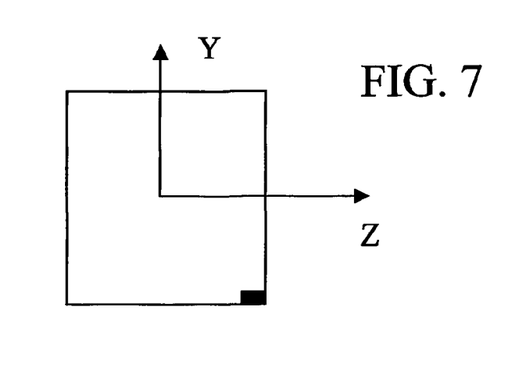
FIG. 7 is a schematic view of the effects on the drum of the eccentric mass of FIG. 6.

The several parameters can be determined with a reference washing machine loaded with a low-value known mass and thanks to the high sensitivity of the system represented by the external rotor synchronous motor and by the low driving ratio. This mass is put in static and dynamic imbalance conditions, as shown in FIGS. 6 and 7.

During the transient steps, for example when passing from the washing step to the centrifugal step, i.e. when the drum 2 is driven with sudden acceleration variations, the dynamical imbalance prevails and it is possible to detect the value Sd always by measuring the standard deviation $\sigma$ of the current Iq absorbed by the motor.

The current Iq absorption variation always occurs in relation with a predetermined reference, such as for example an average value of such a current or a predetermined threshold value.

Advantageously, according to the invention, the method thus provides a constant monitoring of the instantaneous current absorbed by the motor 3 and allows computing each variation $\alpha$ of said current Iq.

In a first step of the invention:

the unbalanced mass m is thus calculated in real time, on the basis of the standard deviation $\sigma$ of said current Iq starting from a predetermined reference and by applying the calculation formula (1) or (2).

Figure 12:
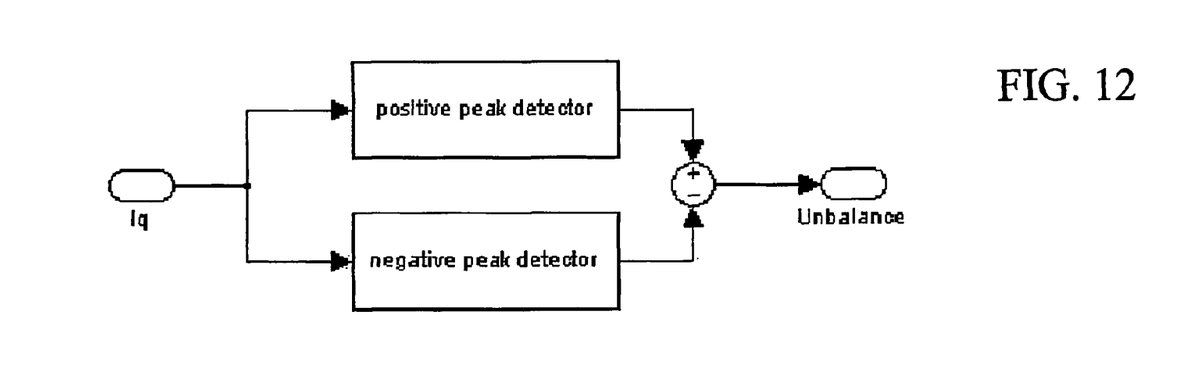
FIG. 12 is a schematic view of a computing principle adopted for the method of the present invention.
Figure 13:
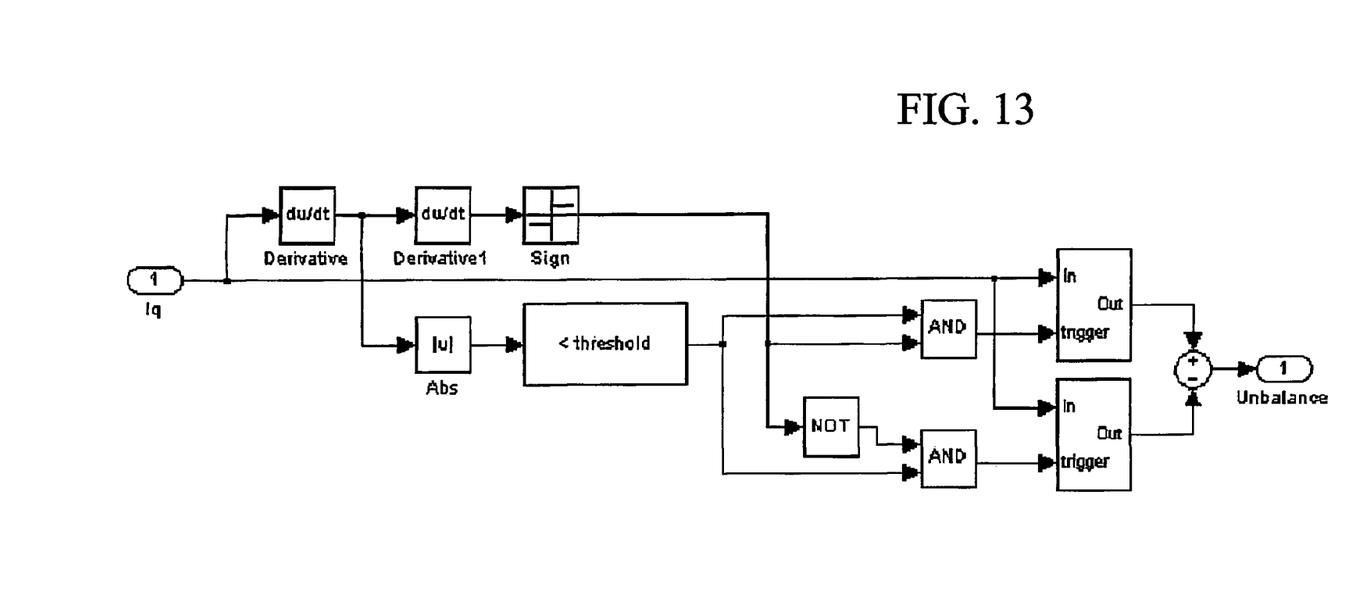
FIG. 13 is a more detailed blocks schematic view of the computing principle of FIG. 12.

In a second step of the invention:

making reference to FIG. 12, the imbalance signal is computed as a difference between the last detected positive peak value of current Iq and the last negative peak value of the same current Iq. As far as this second step is concerned, and making now reference to the example of FIG. 13, the imbalance signal is computed as a difference between the last sampled value of the current signal Iq, in the time instant wherein the absolute value of the first derivate of the signal Iq is minor than a predetermined threshold and the second derivate of the same signal Iq is positive, and the last sampled value of the signal Iq in the time instant wherein the absolute value of the first derivate of the signal Iq is minor than a predetermined threshold and the second derivate of the same signal Iq is negative.

The selection between the first or second step of the inventive method to be applied occurs automatically on the basis of the results of the detection in the current Iq absorption. More specifically, if the control is obtained through a sinusoidal signal the second step is applied, otherwise the first.

The representative value m of the unbalanced mass being obtained, it is thus possible to feedback and current drive the motor 3 for adjusting the operation thereof and specifically adjusting the angular revolution speed of the motor.

Figure 11:
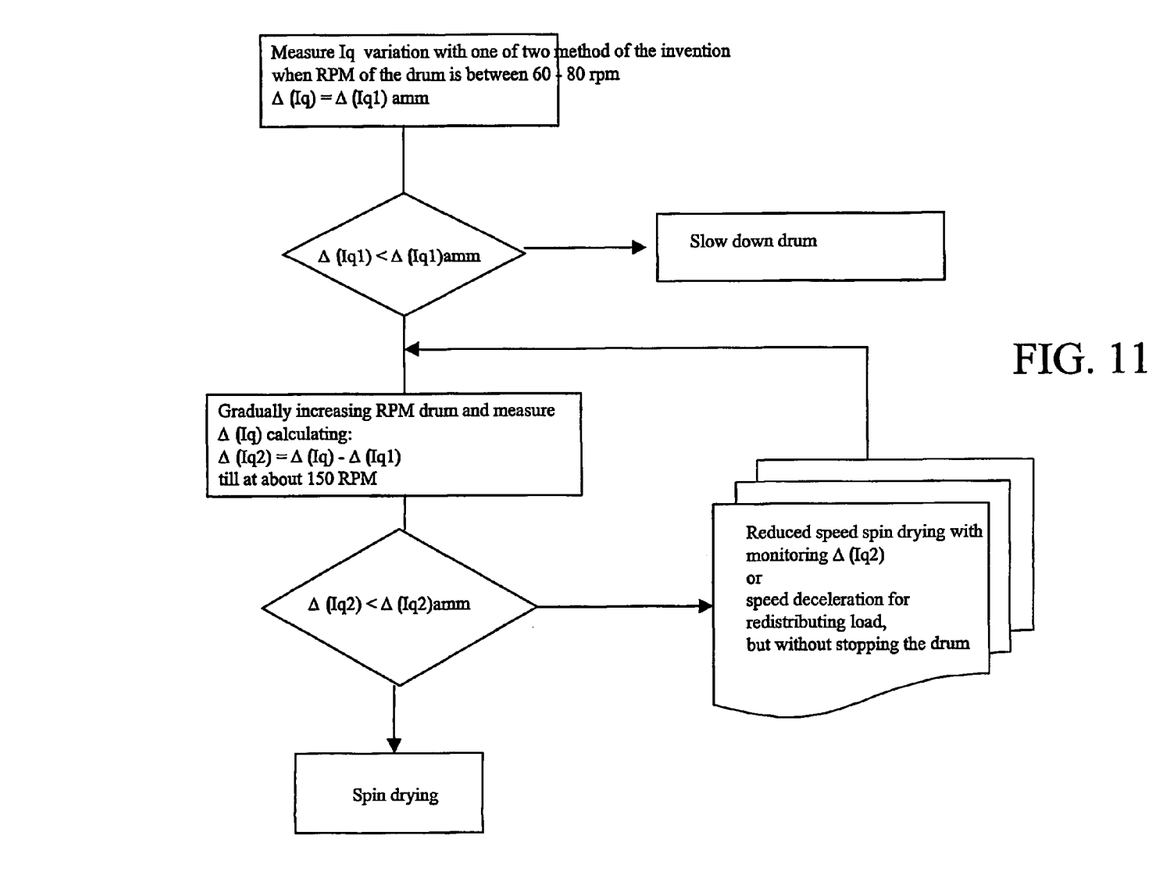
FIG. 11 is a schematic view of a flowchart showing the operating steps of the method according to the invention.

More particularly, as well shown in the flowchart of FIG. 11, the method of the invention develops according to the following steps:

1) The imbalance Sb is measured at first in a range of drum rotation values comprised between 60 and 80 revolutions per minute. In this range a so-called satellization of the load against the drum walls generally occurs.

2) A control step is performed afterwards to check that the imbalance is lower at a predetermined acceptable reference value, for example $\Delta(Iq_1) < \Delta(Iq_1)_{AMM}$;

3) If the control gives a negative result, the drum 2 is slowed down, otherwise a further gradual increase of the rotation speed and a subsequent imbalance measure are performed, but calculating the difference between: $\Delta(Iq_2) = \Delta(Iq) - \Delta(Iq_1)$ until about 150 rpm continuously monitoring current variation switching between the more convenient embodiement of the invention measuring umbalance until about 150 rpm;

4) At this point a second control step allows to check if the imbalance is lower than a second predetermined reference value, for example $\Delta(Iq_2) < \Delta(Iq_2)_{AMM}$;

5) If this further control gives a negative result, a centrifugal step can be performed at reduced speed, continuously monitoring the imbalance and, alternately, the drum can be slowed down, but without stop, in order to distribute again the load, repeating then the sequence from point (3);

6) On the contrary, if the control has a positive result, the centrifugal step is directly performed.

From the previous description it clearly results that the control method according to the invention solves the technical problem and it achieves several advantages, the first being the fact that the driving of the synchronous motor operating the drum can always occur in optimum conditions being compared with experimental parameters that are representative of the possible unbalanced mass inside the washing machine drum.

Moreover, the feedback driving and adjusting of the angular revolution speed of the motor allows to proceed the washing activity slowing down the rotation of the motor but avoiding unnecessary stopping of the synchronous motor that suffers at the start up phase.

The invention claimed is:

1. A method for detecting unbalanced conditions of a rotating load driven by a synchronous electric motor in washing machines and similar household appliances including a rotatable drum and wherein at least a transient step is provided with angular speed (w) variation of the rotatable drum, the method comprising the following steps:

constantly monitoring and detecting the instantaneous current (Iq) absorbed by the motor;

calculating in real time the value of an unbalanced mass (m) on the basis of the variation ($\Delta$) of said current (Iq) and starting from a predetermined reference obtained by experimental results and by applying a calculation formula representative of the kind of load imbalance;

checking that said value of unbalanced mass is lower than a predetermined acceptable reference value ($\Delta(Iq_1)_{AMM}$) and slowing down the angular speed (w) of said drum in case of negative result;

said current (Iq) driving as a feedback signal said motor according to said value of unbalanced mass (m) adjusting the angular revolution speed of the motor in real or continuous time, wherein an imbalance signal is computed as a difference between the last sampled value of the current signal (Iq), in the time instant wherein the absolute value of the first derivate of said current signal (Iq) is less than a predetermined threshold and the second derivate of the same signal Iq is positive, and the last sampled value of said current signal (Iq) in the time instant wherein the absolute value of the first derivate of said current signal (Iq) is less than a predetermined threshold and the second derivate of the same signal Iq is negative.

2. The method according to claim 1, wherein the method provides a comparison between the standard deviation ($\sigma$) of said current (Iq) with a predetermined reference stored in a memory unit including for example an average value of this current (Iq) or a predetermined threshold value.

3. A method for detecting unbalanced conditions of a rotating load, driven by a synchronous electric motor in washing machines and similar household appliances including a rotatable drum and wherein at least a transient step is provided with angular speed (w) variation of the rotatable drum, the method comprising the following steps:
- constantly monitoring and detecting the instantaneous current (Iq) absorbed by the motor;
- calculating in real time the value of an unbalanced mass (m) on the basis of the variation ($\Delta$) of said current (Iq) and starting from a predetermined reference obtained by experimental results and by applying a calculation formula representative of the kind of load imbalance;
- checking that said value of unbalanced mass is lower than a predetermined acceptable reference value ($\Delta(Iq_1)_{AMM}$) and slowing down the angular speed (w) of said drum in case of negative result;
- said current (Iq) driving as a feedback signal said motor according to said value of unbalanced mass (m) adjusting the angular revolution speed of the motor in real or continuous time,
- wherein the measure of said unbalanced mass (m) occurs at first by measuring said current (Iq) variation ($\Delta$) with a low number of drum revolutions comprising between 60 and 80 revolutions per minute.

4. Method according to claim 3, further comprising a step for controlling that the measured variation ($\Delta(Iq_1)$) at a said low number of drum revolutions is lower than a predetermined acceptable reference value ($\Delta(Iq_1)_{AMM}$) and subsequently slowing down the drum rotation speed (w) if this check gives a negative result.

5. Method according to claim 3, further comprising a step for controlling that the measured variation ($\Delta(Iq_1)$) at a said low number of drum revolutions is lower than a predetermined acceptable reference value ($\Delta(Iq_1)_{AMM}$) and subsequently gradually increasing the drum revolving speed (w) if the control gives a positive result.

6. Method according to claim 5, wherein the gradual speed increase continues until about 150 revolutions per minute are reached.

7. Method according to claim 5, further comprising a step of further controlling that the measured variation ($\Delta(Iq_2)$) at increased number of revolutions is lower than a second predetermined acceptable reference value ($\Delta(Iq_2)_{AMM}$).

8. Method according to claim 7, further comprising a centrifugal step at reduced rotation speed if said further control gives a negative result.

9. Method according to claim 7, further comprising a centrifugal step is started if said further control gives a positive result.

10. Method according to claim 7, further comprising a slow down, without stop, of the drum rotation speed in order to cause a new load distribution if said further control gives a positive result.

11. Method according to claim 8, further comprising a steady monitoring of said measured variation ($\Delta(Iq_2)$) in the centrifugal step at reduced speed.

12. A method for detecting unbalanced conditions of a rotating load driven by a synchronous electric motor in washing machines and similar household appliances including a rotatable drum and wherein at least a transient step is provided with angular speed (w) variation of the rotatable drum, the method comprising the following steps:
- constantly monitoring and detecting the instantaneous current (Iq) absorbed by the motor,
- calculating in real time the value of an unbalanced mass (m) on the basis of the variation ($\Delta$) of said current (Iq) and starting from a predetermined reference obtained by experimental results and by applying a calculation formula representative of the kind of load imbalance;
- checking that said value of unbalanced mass is lower than a predetermined acceptable reference value ($\Delta(Ig_1)_{AMM}$) and slowing down the angular speed (w) of said drum in case of negative result;
- said current (Iq) driving as a feedback signal said motor according to said value of unbalanced mass (m) adjusting the angular revolution speed of the motor in real or continuous time,
- wherein a comparison between the standard deviation ($\sigma$) of said current (Iq) with a predetermined reference is stored in a memory unit including for example an average value of this current (Iq) or a predetermined threshold value, and
- wherein the comparison between the variation ($\Delta$) and said current (Iq) occurs both in static unbalanced conditions and in dynamic unbalanced conditions.

13. Method according to claim 12, wherein the one variation operator is the standard deviation operator ($\sigma$) and is drawn, for a dynamic imbalance, from the following relation:

$\sigma(Iq)_{dynamic} = m * K2 * w^{\oplus} + Ko$

Where: Ko, K2 and $\sigma$ are known constant experimentally-determined values, w is the rotation speed and m is said unbalanced mass.

* * * * *